(12) United States Patent
Somerfield

(10) Patent No.: US 9,695,908 B2
(45) Date of Patent: Jul. 4, 2017

(54) CLAMPING ASSEMBLY

(71) Applicant: GRIPPLE LIMITED, Sheffield, South Yorkshire (GB)

(72) Inventor: Alan Somerfield, Lincolnshire (GB)

(73) Assignee: Gripple Limited (GB)

( * ) Notice: Subject to any disclaimer, the term of this patent is extended or adjusted under 35 U.S.C. 154(b) by 62 days.

(21) Appl. No.: 14/434,696

(22) PCT Filed: Oct. 18, 2013

(86) PCT No.: PCT/GB2013/000441
§ 371 (c)(1),
(2) Date: Apr. 9, 2015

(87) PCT Pub. No.: WO2014/064403
PCT Pub. Date: May 1, 2014

(65) Prior Publication Data
US 2015/0267774 A1    Sep. 24, 2015

(30) Foreign Application Priority Data

Oct. 24, 2012    (GB) .................................. 1219119.3
Oct. 16, 2013    (GB) .................................. 1318287.8

(51) Int. Cl.
*F16G 11/00*    (2006.01)
*F16G 11/04*    (2006.01)
(Continued)

(52) U.S. Cl.
CPC .............. *F16G 11/048* (2013.01); *F16B 2/12* (2013.01); *F16B 2/14* (2013.01); *F16G 11/10* (2013.01);
(Continued)

(58) Field of Classification Search
CPC ...... F16G 11/048; F16G 11/10; F16G 11/108; F16G 11/02; F16G 11/03; F16G 11/04;
(Continued)

(56) References Cited

U.S. PATENT DOCUMENTS 4,881,302 A * 11/1989 Lee .................... F16G 11/10
                                                24/115 G
5,193,252 A * 3/1993 Svehaug ................ E04H 15/32
                                                24/115 G
5,572,770 A    11/1996 Boden

FOREIGN PATENT DOCUMENTS

EP        0 878 391        11/1998
FR        1060330 A *    4/1954 ............. F16G 11/10
(Continued)

*Primary Examiner* — Robert J Sandy
*Assistant Examiner* — Matthew Sullivan
(74) *Attorney, Agent, or Firm* — James R. Foley; Clark Hill PLC

(57) ABSTRACT

A clamping assembly (10) comprises a body (12) defining a passage (34) through which an elongate article (100) can extend. A clamping member (16) is arranged in the passage for clamping the elongate article, the clamping member being movable between clamping and release conditions for respectively clamping and releasing the article (100). Urging means (14) comprises a spring (20) to urge the clamping member (16) to the clamping condition. The spring can be deformed to a release configuration to urge the clamping member (16) to the release condition.

19 Claims, 11 Drawing Sheets

(51) Int. Cl.
  *F16G 11/10* (2006.01)
  *F16B 2/12* (2006.01)
  *F16B 2/14* (2006.01)

(52) U.S. Cl.
  CPC ......... *F16G 11/108* (2013.01); *Y10T 24/3969* (2015.01); *Y10T 24/3973* (2015.01); *Y10T 24/3976* (2015.01)

(58) Field of Classification Search
  CPC .......... F16B 2/12; F16B 2/14; Y10T 24/3969; Y10T 24/2973; Y10T 24/3976
  See application file for complete search history.

(56) References Cited

FOREIGN PATENT DOCUMENTS

| | | | |
|---|---|---|---|
| FR | 2661804 A1 * | 11/1991 | ............... A43C 7/00 |
| FR | 2740663 B1 * | 1/1998 | ............. F16G 11/10 |
| GB | 1 273 362 | 5/1972 | |
| GB | 2 290 105 | 12/1995 | |
| GB | 2 378 999 | 2/2003 | |
| GB | 2481849 | 1/2012 | |
| WO | 2009/112806 | 9/2009 | |

* cited by examiner

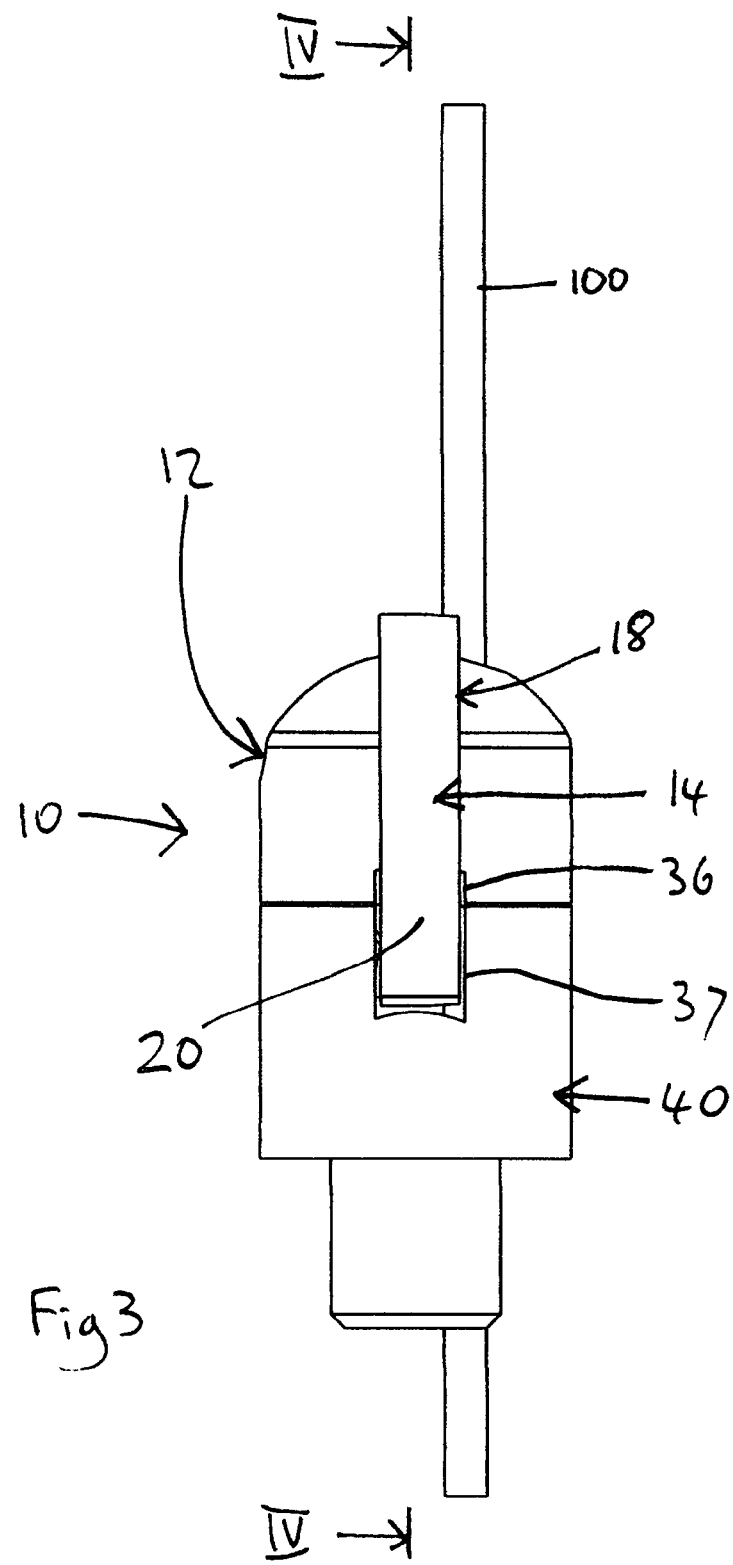

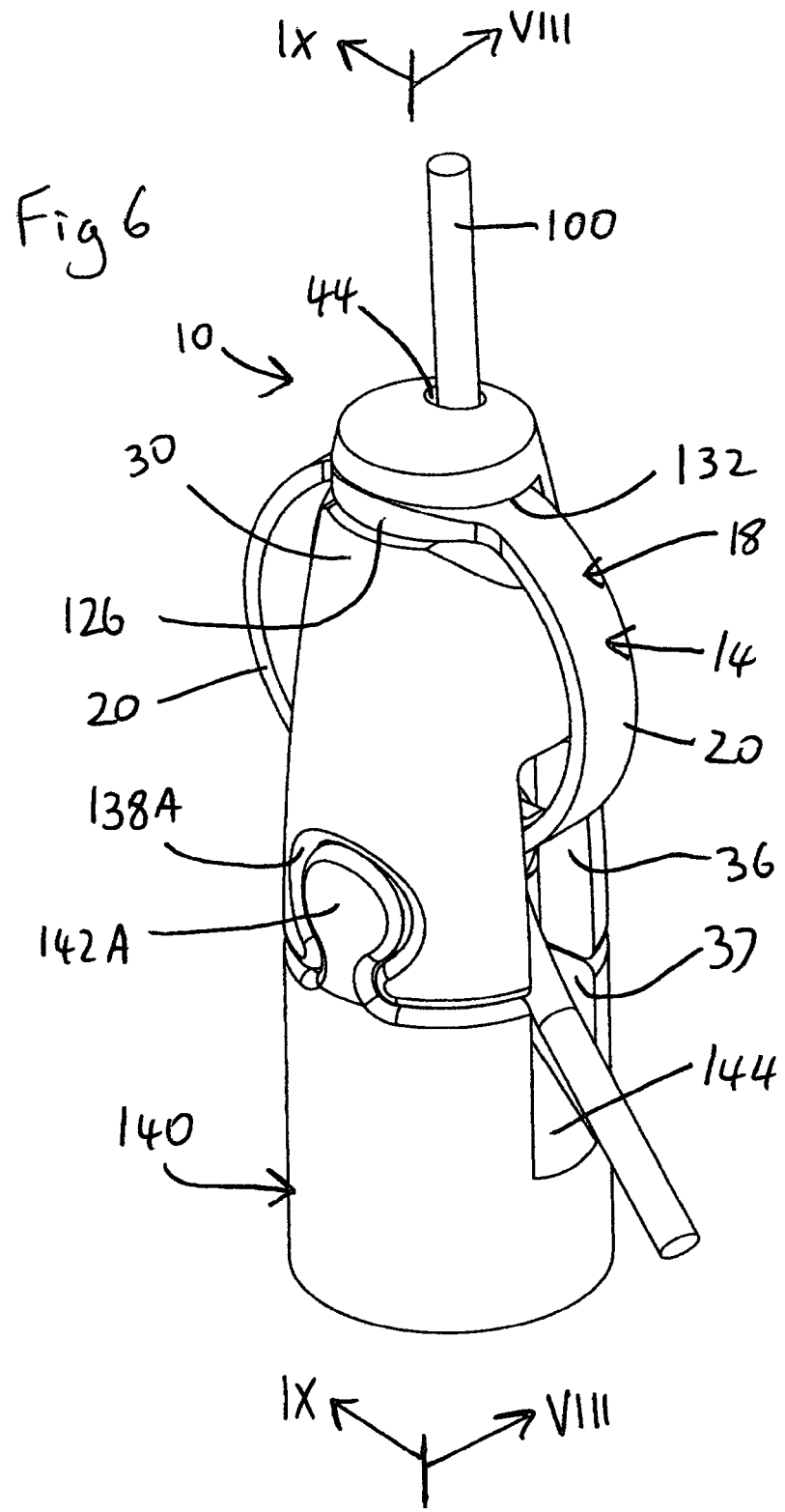

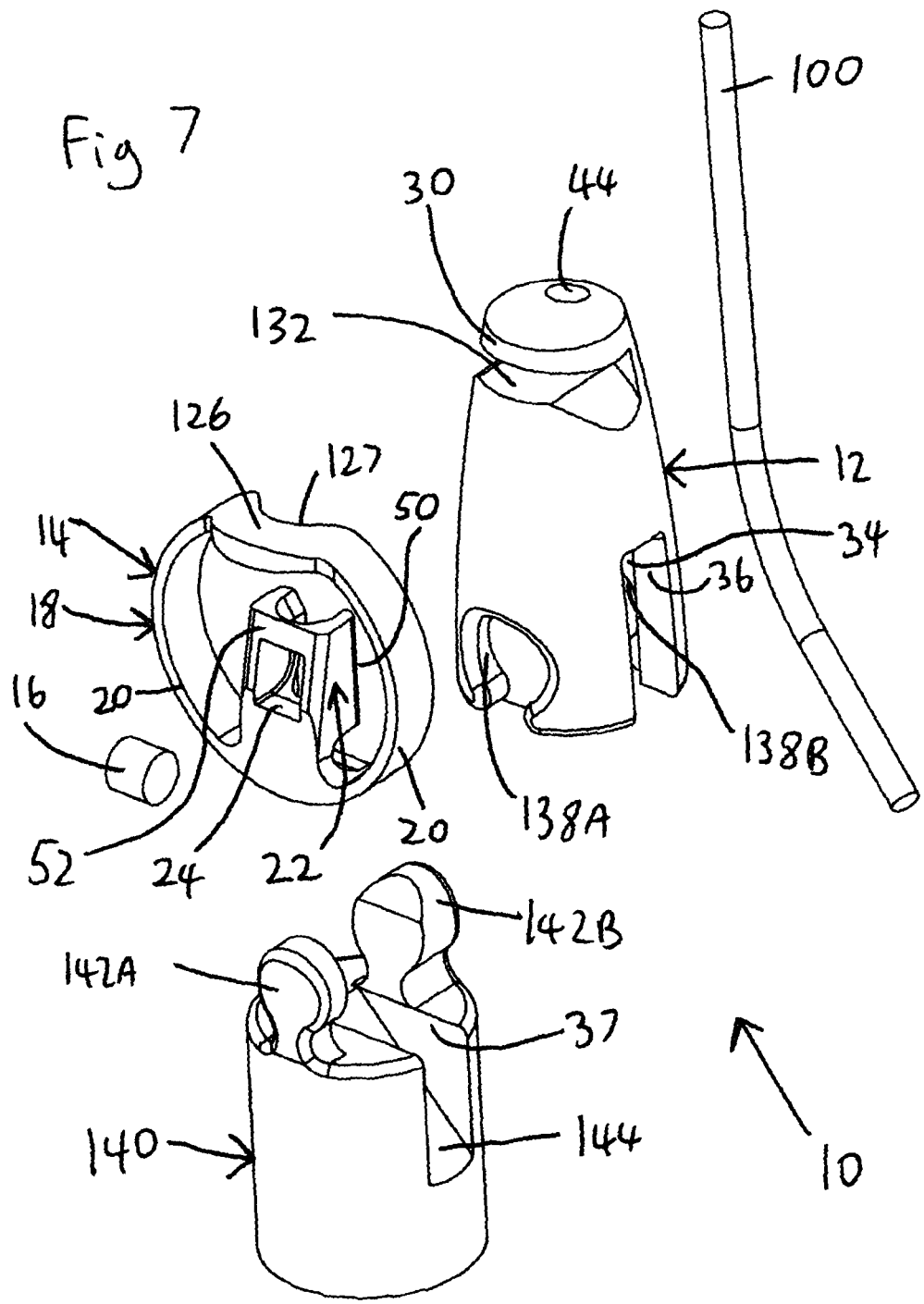

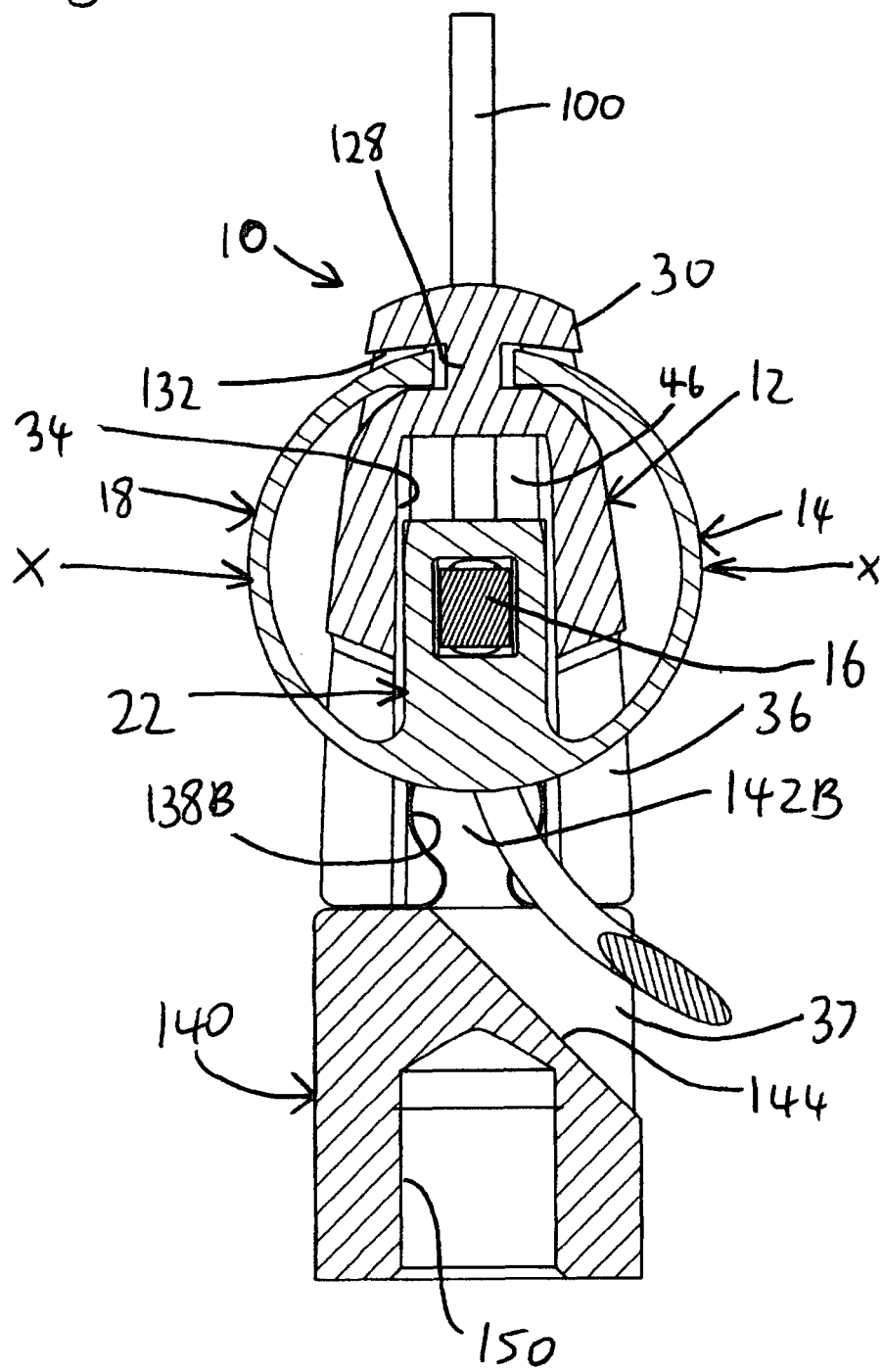

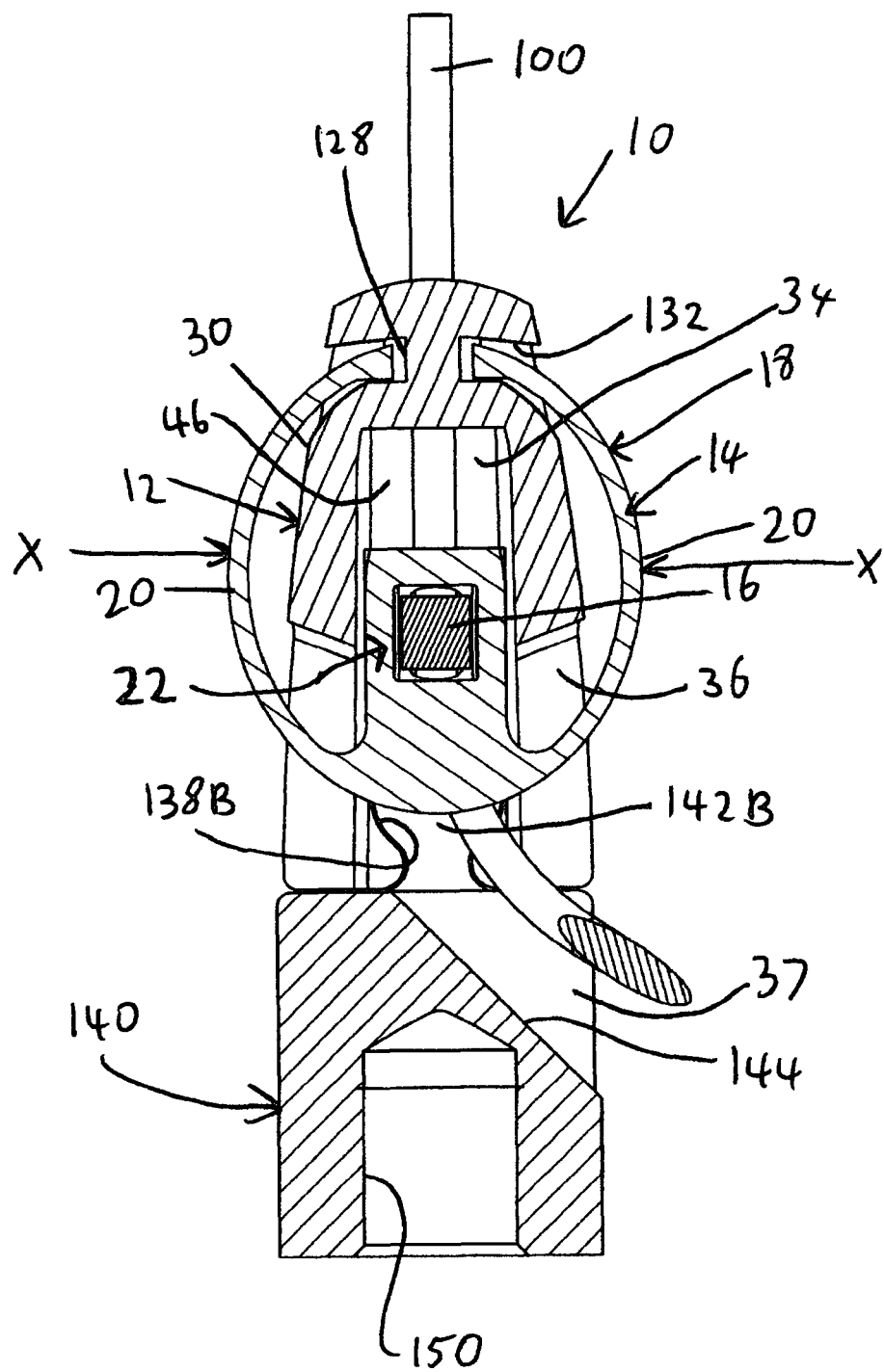

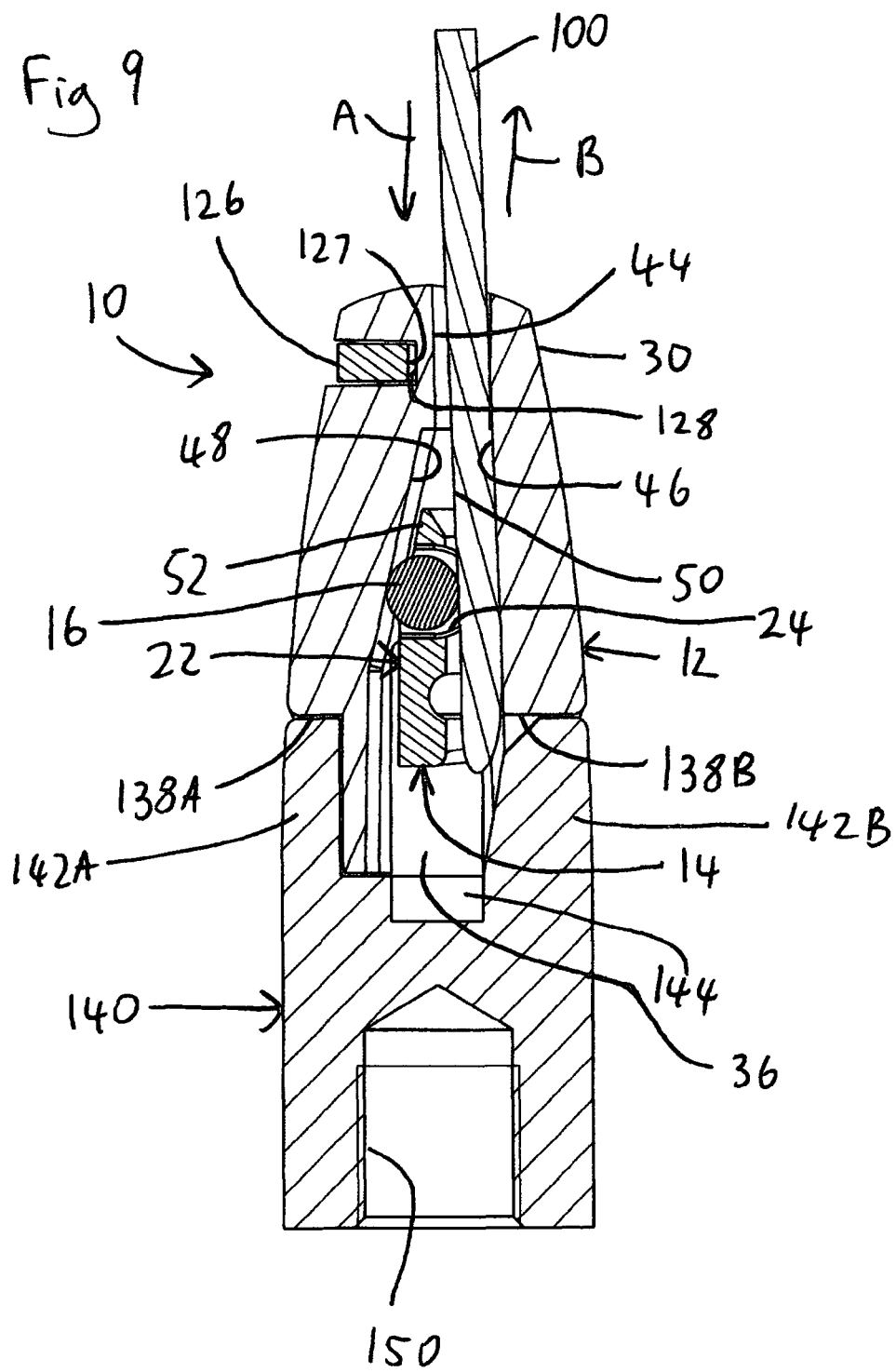

CLAMPING ASSEMBLY

This invention relates to clamping assemblies. More particularly, but not exclusively, this invention relates to clamping assemblies for clamping elongate articles, such as wires, wire ropes or the like. Embodiments of the invention relate to clamping assemblies comprising clamping members urged to a clamping condition by means of urging means.

Clamping assemblies for clamping wire, wire rope or the like are known. For example, patent specification No. GB2240581 discloses a connector comprising a body having a passage and clamping member for clamping a wire in the passage. However, releasing the wire can only be effected by manipulating the wire.

According to one aspect of this invention, there is provided a clamping assembly comprising a body defining a passage through which an elongate article can extend, a clamping member arranged in the passage for clamping the elongate article, the clamping member being movable between clamping and release conditions for respectively clamping and releasing the article, and urging means comprising a spring to urge the clamping member to the clamping position, wherein the spring can be deformed to a release configuration to urge the clamping member to the release condition.

According to another aspect of the invention, there is provided a clamping assembly comprising a body defining a passage through which an elongate article can extend, a clamping member arranged in the passage for clamping the elongate article, the clamping member being movable between a clamping condition in which the clamping member can clamp the article, and a release condition in which the article can be released, and urging means, wherein the urging means comprises a spring to urge the clamping member to the clamping condition.

The urging means may provide a release means for urging the clamping member to the release condition. The spring may comprise a tension spring. The spring may be deformable to a deformed configuration by applying a release force thereto.

Preferably, the spring can be deformed by applying the release force thereto transverse to the direction of movement of the clamping member between the clamping and release conditions. The release force may be applied in a direction towards the body. The deformation of the spring desirably urges the clamping member to the release condition.

In the embodiment described herein, the application of the release force to the spring causes the spring to push the clamping member to the release condition.

The spring may extend externally of the body, thereby allowing the user to apply said release force thereto, for example, by pressing the spring with his or her finger.

The urging means may hold the clamping member. The urging means may comprise a carriage attached to the spring, wherein the carriage carries the clamping member. The carriage may define a space in which the clamping member is received.

The clamping assembly may further include anchor means to anchor the urging means to the body. The anchor means may comprise an anchor portion and the body may include cooperating means to cooperate with the anchor portion and anchor the urging means to the body.

The cooperating means may comprise a holding formation for holding the anchor portion. The holding formation may be an aperture or recess to receive the anchor portion. The aperture or recess may be defined in the body. The urging means may include the anchor portion. In a first embodiment, the anchor portion may be attached to the spring by an attaching member.

The holding formation may be a slot to receive the anchor portion. In one embodiment, the slot may be an upwardly facing slot. In another embodiment, the slot may be a side facing slot.

The urging means may comprise a further spring, thereby comprising a pair of said springs. The further spring may comprise a tension spring. Each spring may be attached to the carriage. The anchor member may be attached to both springs by the attaching member. The, or each, spring may extend externally of the body. The, or each, spring may comprise an elongate strip, which may be a substantially flat strip.

In a second embodiment, the anchor portion may extend between the pair of springs, and may comprise a connecting member to connect the springs to each other. The connecting member may be substantially flat.

The, or each, spring may comprise an elongate curved member. The curved member may curve outwardly way from the body. The urging means may be in the form of a ring. The, or each, spring may comprise a flat spring.

The urging means may be deformed by pressing the pair of springs towards each other. Both springs may be pressed towards the body to effect said movement of the clamping member to the release condition.

The clamping member may comprise a roller, which may be in the form of a cylindrical member or a ball. Alternatively, the clamping member may comprise a wedge.

The body may comprise a first wall partly defining said passage. The clamping member may be movable substantially parallel to said first wall. The clamping member may clamp the elongate article against the first wall.

The body may include a second wall partly defining said passage, the second wall extending at an acute angle to said first wall. The clamping member may be movable along said passage from the release condition to the clamping condition. The carriage may have a first face substantially parallel to the first wall and a second face substantially parallel to the second wall.

The second wall may be a reaction wall to apply a reaction force to said clamping member when the clamping member clamps the article against the first wall. The second wall may taper towards the first wall in the direction in which the clamping member moves from the release condition to the clamping condition.

The, or each spring, may be formed of a plastics material.

The clamping assembly may include securing means for securing the clamping assembly to an ancillary member. In one embodiment, the securing means may comprise a securing member, which may be configured to be received by a portion of the ancillary member, or which may be configured to receive a portion of the ancillary member.

In another embodiment, the securing means may comprise a recess which can receive a projection on the ancillary member. The recess may be defined by the body. Alternatively, the securing means may comprise a projection which can be received by a recess defined by the ancillary member.

The body may define a pair of opposed recesses or a pair of opposed projections.

Embodiments of the invention will now be described by way of example only with reference to the accompanying drawings, in which:

FIG. 3 is a side view of the first embodiment of the clamping assembly;

FIG. 6 is a perspective view of a second embodiment of a clamping assembly;

FIG. 7 is an exploded view of the first second of the clamping assembly.

FIG. 8A is sectional view along the lines VIII-VIII in FIG. 3, showing a clamping member in a clamping condition;

FIG. 8B is a view which is similar to FIG. 8A, but which shows the clamping member in a release condition; and FIG. 9 is a sectional view along the lines IX-IX in FIG. 6.

Figure 1:
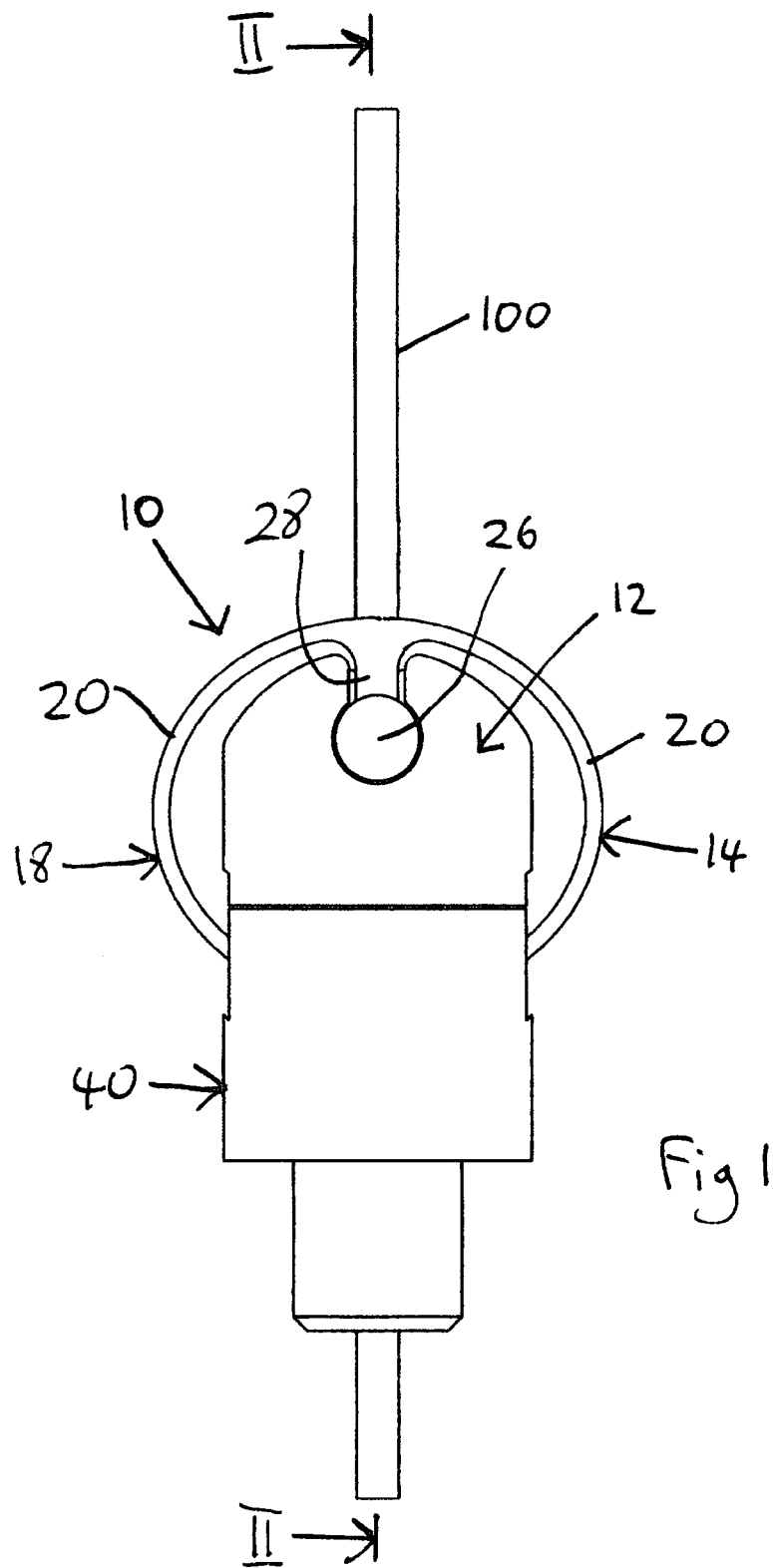
FIG. 1 is a front view of a first embodiment of a clamping assembly.

Referring to the FIGS. 1 to 5 of the drawings, there is shown a clamping assembly 10 for clamping an elongate article 100 in the form of a wire, wire rope or the like. The clamping assembly 10 comprises a body 12, urging means 14 and a clamping member 16 for clamping the elongate article within the body 12.

Figure 4A:
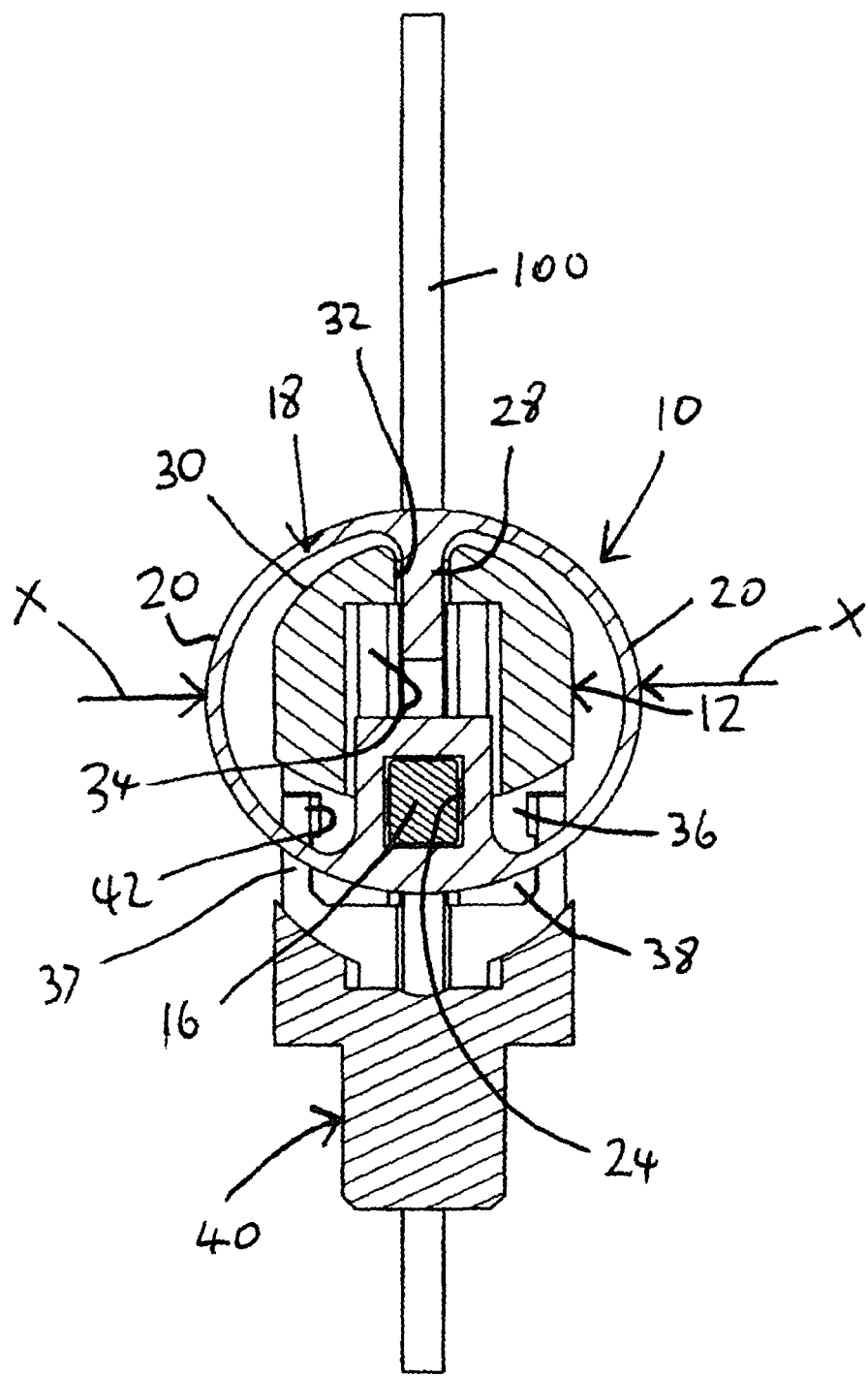
FIG. 4A is view along the lines IV-IV in FIG. 3, showing a clamping member in a clamping condition.
Figure 4B:
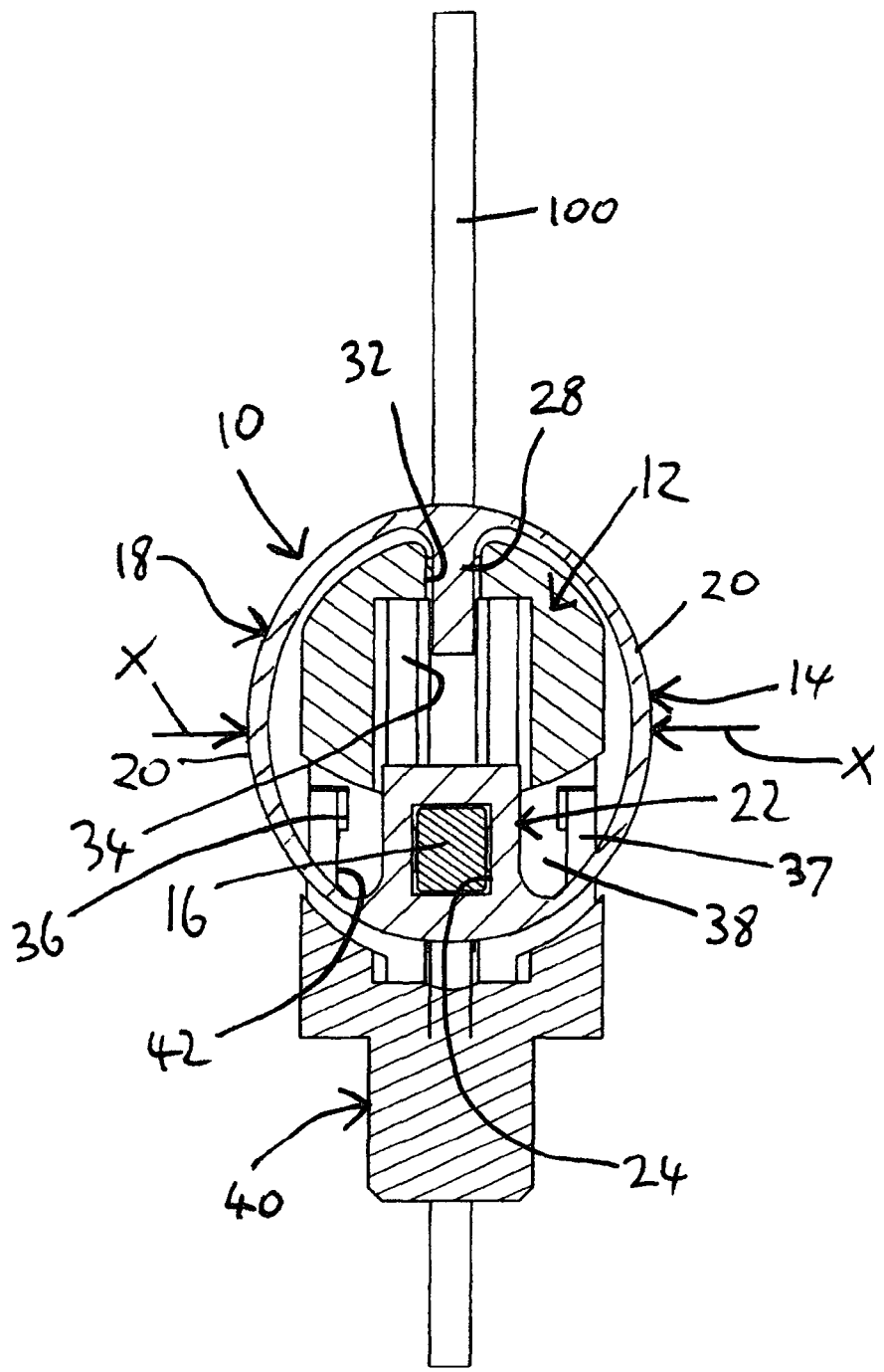
FIG. 4B is a view which is similar to FIG. 4A, but which shows the clamping member in a release condition.
Figure 5:
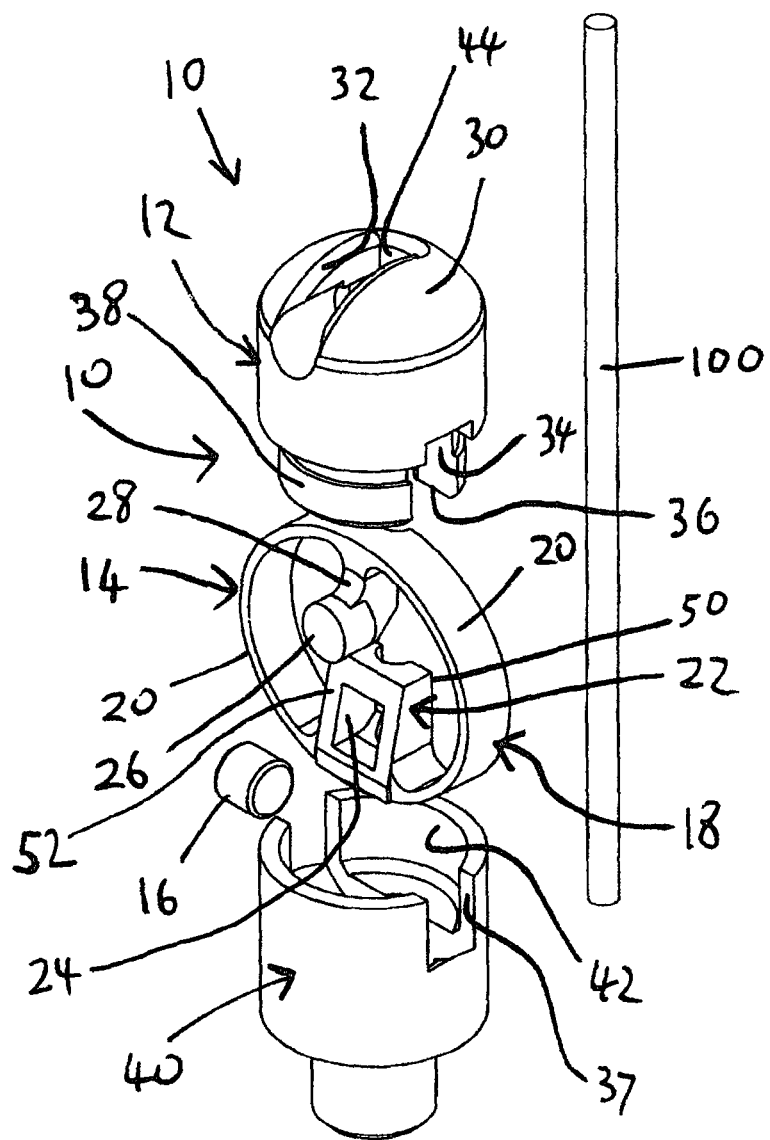
FIG. 5 is an exploded view of the first embodiment of the clamping assembly.

The clamping member 16 is movable from a clamping condition shown in FIG. 4A to a release condition shown in FIG. 4B. In the embodiment described herein, the clamping member 16 is in the form of a cylindrical roller.

The urging means 14 comprises a ring 18 formed of a pair of springs 20 in the form of tension springs. Each spring 20 is in the form of an elongate curved member, which curves outwardly away from the body 12, as shown most clearly in FIGS. 1, 4A and 4B. Each spring 20 is in the form of a substantially flat strip.

The urging means 14 further includes a carriage 22, in the form of a substantially square member, integrally attached to the springs 20. The springs 20 extend outwardly from the carriage 22 on opposite sides thereof. The carriage 22 defines a space 24 in which the clamping member 16 is carried.

The urging means 14 also includes an anchor portion 26, which is attached to the springs 20 via an attaching member 28. Each spring 20 extends from the carriage 22 to the attaching member 28.

The body 12 includes a domed upper region 30 defining a holding formation in the form of an upwardly facing slot 32. The anchor portion 26 is received in the upwardly facing slot 32 and held therein to secure the urging means 14 to the body 12.

The body 12 further defines a passage 34 in which the carriage 22 and the clamping member 16 are held. The body 12 also includes a securing member in the form of a securing portion 38 opposite the upper region 30.

The securing portion 38 is provided to secure the body 12 to an ancillary member 40 to attach the clamping assembly to, for example, a load, such as mounted on a threaded rod. The ancillary member 40 defines a mouth portion 42 to receive the securing portion 38, thereby securing the body 12 to the ancillary member 40.

A first opening 36 is defined in the body 12, and extends across the securing portion 38 opposite the upper region 30. The first opening 36 provides communication between the passage 34 and the region outside the body 12. The first opening 36 allows the carriage 22 to be received in the passage 34. The springs 20 extend through the first opening 36 to the carriage 22 in the passage 34. The ancillary member 40 defines an associated second opening 37 which is aligned with the first opening 36 when the ancillary member 40 is secured to the body 12. Thus, the springs 20 extend from the attaching member 28 in opposite directions around the body 12 to the carriage 22 in the passage 34, through the first opening 36 and the associated opening 37.

Figure 2:
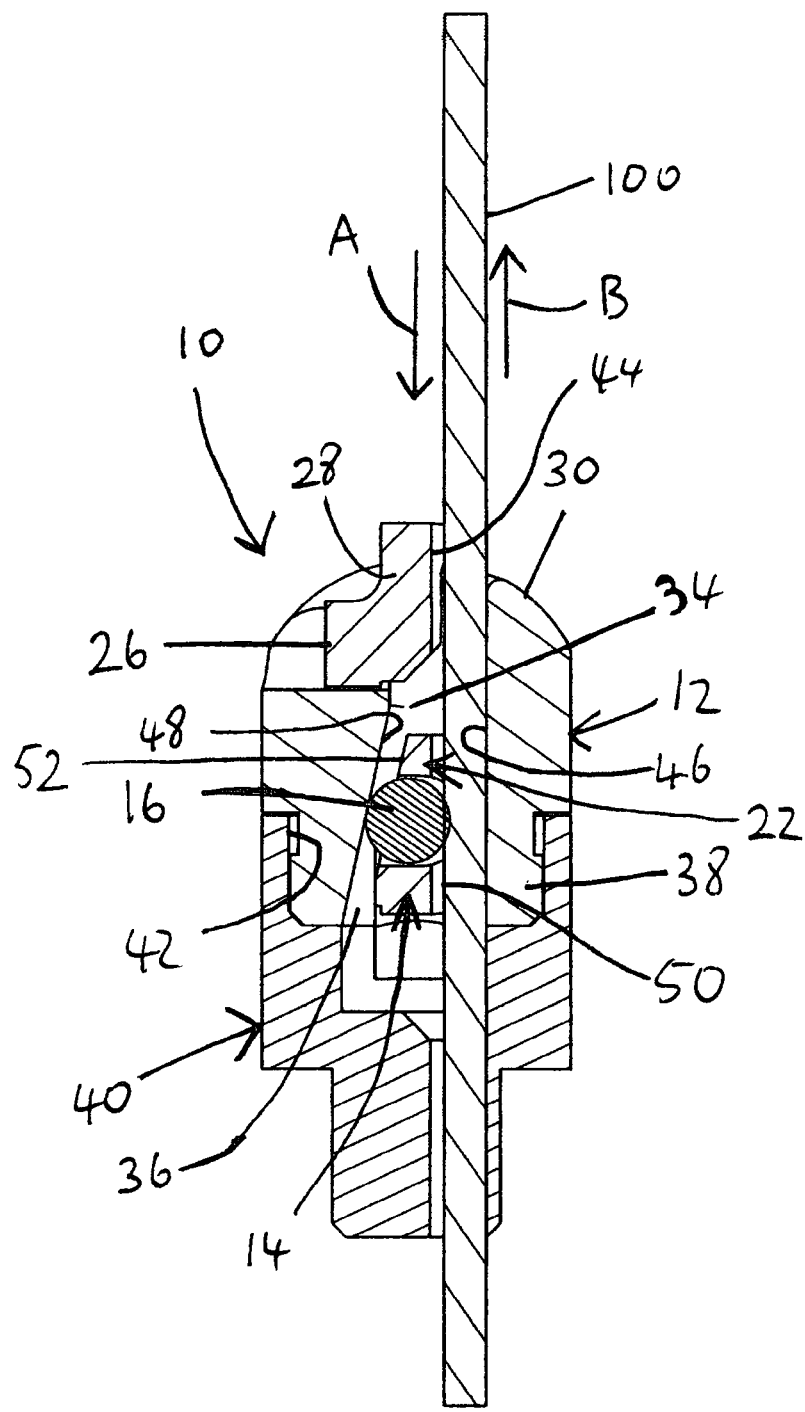
FIG. 2 is a view along the lines II-II in FIG. 1.

Referring specifically to FIG. 2, the passage 34 defined in the body 12 extends through the upper region 30 to a second opening 44 opposite the first opening 36. Thus, the elongate article 100 can extend through the passage 34, entering and exiting the body 12 via the first and second openings 36, 44.

The passage 34 is defined between first and second internal walls 46, 48 of the body 12. The elongate article 100 extends along the first wall 46. The second wall 48 is arranged at an acute angle to the first wall 46, and tapers towards the first wall 46 in the direction from the first opening 36 to the second opening 44.

The carriage 22 has a first face 50 which faces the first wall 46 and extends substantially parallel thereto. The carriage 22 also has a second face 52 which faces the second wall 48 and extends substantially parallel to the second wall 48.

In use, the ancillary member 40 is secured to the body 12, and the elongate article 100 is threaded through the passage 34 in the body 12 in the direction indicated by the arrow A in FIG. 2. When the clamping assembly 10 is at a desired position on the elongate article 100, the elongate article 100 is then moved in the opposite direction, as indicated by the arrow B in FIG. 2.

The springs 20, being under tension, pull the carriage 22 and the clamping member 16 in the direction indicated by the arrow B, and into engagement with the elongate article and the second wall 48. In addition, movement of the elongate article in the direction indicated by the arrow B, when the clamping member engages the elongate article 100 further pulls the carriage 22 and the clamping member 16 in the same direction.

The tapering of the second wall 48 towards the first wall 46 forces the clamping member 16 into tighter engagement with the elongate article 100 as a result of such movement, thereby clamping the elongate article 100 to the gripping assembly 10. FIGS. 2 and 4A show the carriage 22 holding the clamping member 16 in the clamping condition in which the clamping member 16 clamps the elongate article 100.

The position of the clamping assembly 10 along the elongate member 100 can be adjusted, for example, if the user realises that the clamping assembly 10 has been arranged on the elongate article 100 in the wrong position. This can be done by pressing inwardly on the springs 20 as shown by the arrows X in FIGS. 4A and 4B, to deform them to a release configuration shown in FIG. 4B. Such deformation of the springs 20 pushes the carriage 22 and the clamping member 16 from the clamping condition shown in FIG. 4A to the release condition shown in FIG. 4B.

When the clamping member 16 is in the release condition, the elongate article 100 is not clamped by the clamping member 16, thereby allowing the clamping assembly 10 to be moved along the elongate member 100 to the correct position. The clamping assembly 10 can then be clamped to the elongate article 100 as described above.

Various modifications can be made without departing from the scope of the invention. For example, the clamping member could be a spherical member or a wedge shaped member.

There is thus described a clamping assembly 10 for clamping an elongate article 100, in which the clamping member 16 can be easily released from the clamping condition to the release condition by pressing inwardly on the springs 20.

A second embodiment of the clamping assembly 10 is shown in FIGS. 6 to 9. The second embodiment of the clamping assembly 10 includes many of the features of the first embodiment shown in FIGS. 1 to 5. In FIGS. 6 to 9, the features of the first embodiment that are present in the second embodiment are designated with the same reference numerals as in FIGS. 1 to 5.

The second embodiment differs from the first embodiment in that the upper region 30 defines a side facing slot 132. A further difference is that the urging means 14 comprises an anchor portion in the form of a substantially flat connecting member 126.

The connecting member 126 connects the springs 20 to each other at the top of the urging means 14. The connecting member 126 is received in the side facing slot 132 from outside the body 12, and is thus held by the body 12. The connecting member 126 defines a cooperating recessed formation 127 to cooperate with a protrusion 128 in the side facing slot 132 (see FIGS. 7, 8A and 8B).

The carriage 22 and the clamping member 16 are held in the passage 34 in the body 12 in the same way as the first embodiment. The second embodiment thus operates in the same way as the first embodiment.

Another difference is that the body 12 includes a pair of opposed securing formations in the form of two recesses 138A, 138B defined by the body 12. An ancillary member 140 includes a pair of opposed projections 142A, 142B which can be received in the recesses 138A, 1386, thereby securing the ancillary member to the body 12. The ancillary member 140 includes a sloped wall 144 along which the elongate article 100 can extend when the elongate article 100 is clamped by the clamping member 16.

The ancillary member may have a fastening formation 150, such as a threaded bore, to fasten a further article (not shown), such as a threaded rod, thereto.

FIGS. 8A and 8B show sectional views of the second embodiment of the clamping assembly 10 in the clamping and release conditions. FIG. 8B shows the urging means 14 in a release configuration. These views are similar to the views shown in FIGS. 4A and 4B.

The above described embodiments have the advantage that there is no need for an end cap. Instead the ancillary members 38, 140 are provided, which can be replaced by a different ancillary members 38, 140, thereby allowing the clamping assembly to perform different functions. The above described embodiments also have the advantage that the clamping member 16 is devoid of teeth, and can be formed of zinc, thereby reducing expense.

Further advantages of the above described embodiments are that the number of parts is reduced as compared with prior art designs, and the ability to move the clamping member 16 to the release condition, i.e. by pressing inwardly on the springs 20, allows much easier release than with prior art designs.

The second embodiment has the further advantage that by providing a slot 132 in the side of the body 12, removal of the urging means 14, and the clamping member 16 is simplified.

The invention claimed is:

1. A clamping assembly comprising a body defining a passage through which an elongate article can extend, a clamping member arranged in the passage for clamping the elongate article, the clamping member being movable between clamping and release conditions for respectively clamping and releasing the article, and urging means comprising a pair of springs to urge the clamping member along the passage towards the clamping condition, wherein the springs extend externally of the body opposite each other and can be deformed by pressing the pair of springs towards each other to a release configuration to urge the clamping member to the release condition, and wherein the body comprises first and second opposed walls defining said passage, the second wall extending at an acute angle to said first wall, and the clamping member being arranged in the passage so that it can be pulled by the elongate article along the passage in engagement with the second wall to clamp the elongate article against the first wall.

2. A clamping assembly according to claim 1, wherein the spring is deformable to the release configuration by applying a release force thereto transverse to the direction of movement of the clamping member between the clamping and release conditions, whereby application of the release force to the spring causes the spring to push the clamping member to the release condition.

3. A clamping assembly according to claim 2, wherein the spring is deformable to the release configuration by applying the release force thereto in a direction towards the body.

4. A clamping assembly according to claim 1, wherein the urging means comprises a carriage attached to the springs, wherein the carriage carries the clamping member.

5. A clamping assembly according to claim 4, wherein the carriage defines a space in which the clamping member is received.

6. A clamping assembly according to claim 4, wherein the clamping assembly further includes anchor means to anchor the urging means to the body, the anchor means comprising an anchor portion and the body including cooperating means to cooperate with the anchor portion and anchor the urging means to the body.

7. A clamping assembly according to claim 6, wherein the cooperating means comprises a holding formation for holding the anchor portion, the holding formation being an aperture or recess defined by the body to receive the anchor portion, and wherein the urging means includes the anchor portion.

8. A clamping assembly according to claim 6, wherein the holding formation is a slot to receive the anchor portion, the slot being either an upwardly facing slot or a side facing slot.

9. A clamping assembly according to claim 6, wherein the anchor portion is substantially flat.

10. A clamping assembly according to claim 4, wherein each spring is attached to the carriage.

11. A clamping assembly according to claim 10, wherein the anchor portion extends between the pair of springs, and comprises a connecting member to connect the springs to each other.

12. A clamping assembly according to claim 1, wherein the clamping member is movable along said passage from the release condition to the clamping condition, the carriage having a first face substantially parallel to the first wall and a second face substantially parallel to the second wall.

13. A clamping assembly according to claim 1, wherein the second wall tapers towards the first wall in the direction in which the clamping member moves from the release condition to the clamping condition.

14. A clamping assembly according to claim 1, wherein each spring comprises an elongate curved member, each curved member curving outwardly away from the body.

15. A clamping assembly according to claim 1, wherein the urging means is in the form of a ring.

16. A clamping assembly according to claim 1, wherein the clamping member comprises a roller or a wedge.

17. A clamping assembly according to claim 15, wherein the roller is in the form of a cylindrical member or a ball.

18. A clamping assembly according to claim 1 including securing means for securing the clamping assembly to an ancillary member, wherein the securing means comprises a recess which can receive a projection on the ancillary member, the recess being defined by the body.

19. A clamping assembly according to claim 1 including securing means for securing the clamping assembly to an ancillary member, wherein the securing means comprises a projection which can be received by a recess defined by the ancillary member.

* * * * *